(12) United States Patent
Adam et al.

(10) Patent No.: US 11,700,261 B1
(45) Date of Patent: Jul. 11, 2023

(54) TOOL FOR MANAGEMENT OF A POOL OF AUTHORIZATIONS TO USE SOFTWARE

(71) Applicant: T-MOBILE INNOVATIONS LLC, Overland Park, KS (US)

(72) Inventors: Scott Adam, Bellevue, WA (US); Oscar Cummings, Bellevue, WA (US); Yi-Hsin Hsu, Bellevue, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 336 days.

(21) Appl. No.: 17/127,703

(22) Filed: Dec. 18, 2020

(51) Int. Cl.
*H04L 9/40* (2022.01)

(52) U.S. Cl.
CPC .......... *H04L 63/102* (2013.01); *H04L 63/108* (2013.01)

(58) Field of Classification Search
CPC ....... H04L 63/108; G06F 21/629; G06F 21/51
See application file for complete search history.

(56) References Cited

U.S. PATENT DOCUMENTS

| | | | | |
|---|---|---|---|---|
| 5,745,879 A * | 4/1998 | Wyman | ................... | G06F 21/105 726/4 |
| 5,940,504 A * | 8/1999 | Griswold | ............ | G06F 11/3419 705/77 |
| 6,385,596 B1 * | 5/2002 | Wiser | ..................... | H04L 9/3271 369/84 |
| 9,436,814 B2 * | 9/2016 | Kruglick | ................ | G06F 21/121 |
| 11,178,160 B2 * | 11/2021 | Gaspard | ............. | H04L 63/1441 |
| 2003/0061136 A1 * | 3/2003 | Inoue | ..................... | G06F 21/105 705/35 |
| 2004/0058651 A1 * | 3/2004 | Ross | ....................... | H04W 24/00 455/67.11 |
| 2004/0193546 A1 * | 9/2004 | Tokutani | ................. | G06Q 10/10 705/59 |
| 2014/0366150 A1 * | 12/2014 | Fang | ...................... | G06F 21/105 726/26 |
| 2015/0213237 A1 * | 7/2015 | Kruglick | ............... | G06F 21/121 726/26 |
| 2017/0061105 A1 * | 3/2017 | Minagawa | .............. | G06F 21/10 |
| 2018/0089045 A1 * | 3/2018 | Weksler | ............. | G06F 11/2268 |
| 2018/0316702 A1 * | 11/2018 | Gaspard | ............. | H04L 63/1441 |
| 2021/0034715 A1 * | 2/2021 | Nosov | ..................... | H04L 67/53 |

FOREIGN PATENT DOCUMENTS

| | | | | |
|---|---|---|---|---|
| DE | 202013012765 U1 * | 6/2019 | ........... | G06F 16/122 |
| GB | 2343025 A * | 4/2000 | ........... | G06F 21/105 |

* cited by examiner

*Primary Examiner* — Ponnoreay Pich (57) ABSTRACT

A method of managing authorizations to operate a software tool. The method comprises maintaining a count of available authorizations and an authorization allocation list that identifies what authorizations for executing the software tool are allocated to what computers by an authorization resource manager application executing on a computer system, for each of a plurality of computers, determining periodically by the authorization resource manager application if the computer is currently executing the software tool, for each computer determined to be executing the software tool, determining by the authorization resource manager application if an authorization for executing the software tool is allocated to the computer in the authorization allocation list, and, in response to determining that a computer is executing the software tool without being identified as being allocated an authorization in the authorization allocation list, invalidating an authorization identity being used by the computer.

20 Claims, 6 Drawing Sheets

TOOL FOR MANAGEMENT OF A POOL OF AUTHORIZATIONS TO USE SOFTWARE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software development companies may monetize their products by providing the software to users under a licensing agreement. There are a wide variety of licensing arrangements that can be offered. Some licensing agreements may tie authorizations to execute the subject software to a particular computer that the software is installed on, for example one authorization per computer installation. Some licensing agreements may define a number of authorizations to execute the software at one time, for example authorizations for a pre-defined number of "seats." In this licensing model, a pool of authorizations to execute the software may be shared by computers that are greater in number than the number of authorizations granted to a group, but at any moment in time only the number of granted authorizations may be active at that time. Some licensing agreements may be granted on an honor system basis. Other license agreements require the user to input an authorization credential or key, and the software validates the authorization credential before executing the desired software functionality. Yet other software licensing models may be deployed.

SUMMARY

In an embodiment, a method of managing access to a pre-defined number of authorizations to operate a user equipment (UE) chipset diagnostic software tool is disclosed. The method comprises obtaining a pre-defined number of authorizations to operate a UE chipset diagnostic software tool, storing a count of available authorizations in a data store by an authorization resource manager application executing on a computer system, receiving a request from an authorized UE chipset diagnostic computer to use an authorization by the authorization resource manager application, and accessing the data store by the authorization resource manager application. The method further comprises, based on accessing the data store, determining by the authorization resource manager application that at least one authorization is available, requesting by the authorization resource manager application that an authorization controller application send an authorization identity to the UE chipset diagnostic computer that requested to use the authorization, whereby the UE chipset diagnostic computer is provided with an authorization identity that is used to authorize the use of the chipset diagnostic software by the UE chipset diagnostic computer, and storing information about the UE chipset diagnostic computer and the authorization identity by the authorization resource manager application in the data store. The method further comprises decrementing the count of available authorizations in the data store by the authorization resource manager application and, at a predefined time interval, determining by the authorization resource manager application that no UE chipset diagnostic computers are using the chipset diagnostic software tool. The method further comprises, based on determining the chipset diagnostic software tool is not currently in use by any UE chipset diagnostic computer, sending a message by the authorization resource manager application to the authorization controller application to invalidate the authorization identities, whereby UE chipset diagnostic computers that attempt to use the invalidated authorization identities are denied access to operate the UE chipset diagnostic tool and resetting the count of available authorizations to the pre-defined number of authorizations obtained.

In another embodiment, a method of managing access to a pre-defined number of authorizations to operate a software tool is disclosed. The method comprises maintaining a count of available authorizations in a data store by an authorization resource manager application executing on a computer system, receiving a first request by the authorization resource manager application for access to an authorization to operate a software tool, where the first request identifies a first computer where the software tool will be executed, and decrementing the count of available authorizations in the data store by the authorization resource manager application. The method further comprises adding a record of allocation of an authorization to the first computer by the authorization resource manager application into the data store, providing an identity of an authorization by the authorization resource manager application to the first computer, receiving a second request by the authorization resource manager application for access to an authorization to operate the software tool, based on examining the count of available authorizations in the data store, determining by the authorization resource manager application that no authorizations to operate the software tool are available, and rejecting the second request by the authorization resource manager.

In yet another embodiment, a method of managing access to a pre-defined number of authorizations to operate a software tool. The method comprises maintaining a count of available authorizations for executing a software tool and an authorization allocation list that identifies what authorizations for executing the software tool are allocated to what computers by an authorization resource manager application executing on a computer system, and, for each of a plurality of computers within a private network that have the software tool installed, determining periodically by the authorization resource manager application if the computer is currently executing the software tool. The method further comprises, for each computer within the private network determined to be executing the software tool, determining by the authorization resource manager application if an authorization for executing the software tool is allocated to the computer in the authorization allocation list and, in response to determining that a computer within the private network is executing the software tool without being identified as being allocated an authorization in the authorization allocation list, invalidating an authorization identity being used by the computer, whereby the computer is prevented from executing the software tool.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure maintains a distinction between a software licensing agreement, which is a legal construct and a legal document, and the information technology artifacts that enforce and mediate the terms of the software licensing agreement. The information technology system that enforces and mediates the terms of the software licensing agreement is said to manage authorizations to execute software on computers subject to a licensing agreement. In other contexts, however, for example in conversations among technologists such as software engineers and/or system administrators, the term "authorization" used herein may be referred to as a "software license," albeit that usage is not consistent with the strict legal construction of that term.

A manufacturer of chipsets for user equipments (UEs) provides software tools for use by UE device manufacturers and wireless communication network operators for use in testing and/or troubleshooting the UEs. In an example, the software tool or tools may promote capturing and monitoring diagnostic logs, messages, and events on a UE. The software tool or tools may be useful in performing hardware bring up (e.g., when integrating a printed circuit board (PCB) with multiple chips installed), performing software integration, and software test and troubleshooting. UEs comprise mobile phones, smart phones, personal digital assistants (PDAs), wearable computers, headset computers, laptop computers, notebook computers, tablet computers, and/or Internet of things (IoT) devices. The chipset manufacturer sells authorizations for using the software tools under a software licensing agreement, and these authorizations can be relatively expensive. The present disclosure teaches a software authorization management system that may be used to manage sharing a pool of authorizations to execute software subject to a license agreement among a larger plurality of computer systems (e.g., there are fewer authorizations than computers that execute the software at different times).

By efficient and careful management of allocation of authorizations from the pool of authorizations to execute the software to the computers, the software authorization management system promotes purchasing the minimum number of authorizations to execute the software needed to support an enterprise's testing and/or troubleshooting of UEs. The software authorization management system allows enough authorizations to execute the software to be available so that engineers or technicians are not impeded in performing their work functions without entailing unnecessary purchase of expensive authorizations to execute the software. Further, the software authorization management system avoids time-consuming human manager involvement in manually brokering the use of a pool of authorizations to execute the software. The software authorization management system provides a particular technical solution to a technical problem related to using software tools produced by a third party (e.g., produced by some organization other than the organization whose engineers or technicians are using the software tool). The present disclosure contemplates that the software authorization management system taught herein can readily be used for managing a pool of authorizations to execute software products different from the software tools for use in testing and/or troubleshooting UEs. In an embodiment, the software authorization management system manages an enterprise's use of authorizations to execute and/or to use a QXDM Professional™ software tool licensed by Qualcomm® and/or a QCAT software tool licensed by Qualcomm®.

In an embodiment, the software authorization management system provides an interface to users to request authorizations to execute software. A user can hold up to three authorizations at one time (each different project the user is assigned to is associated with a different laptop, and so a user working on multiple projects may be using multiple different laptops—each laptop needing an authorization to execute the software). But if the user tries to obtain a fourth authorization, the software authorization management system denies that request. This limit is arbitrary and may be different in different embodiments or may be a configurable parameter. In an embodiment, the software authorization management system invalidates all authorizations periodically, for example every Sunday night, so users have to periodically request new authorizations from the software authorization management system if they want to use an authorization. In an embodiment, before invalidating an authorization granted to a user, the software authorization management system checks to see if the computer system associated with the user's authorization is currently in use. If the computer system is not in use, the authorization is invalidated. If the computer system is in use, the authorization is not immediately invalidated but is invalidated on the event of the subject computer being powered down or on the event of the subject software tool being terminated on the subject computer. This provision helps keep authorizations allocated to users who need them and avoids an authorization being unnecessarily retained after an engineer or technician completes their work.

In an embodiment, the actual authorizations to execute the software may be managed by an authorization controller application at the enterprise that owns the software tool, and the software authorization management system may broker authorization identifiers that users of the computers executing the subject software tool provide to enable the software tool to execute. The long-term authorizations purchased by the enterprise operating the software authorization management system persists, but the software authorization management system periodically requests the authorization controller application operated by the software owning enterprise to invalidate the authorization identifiers or handles. Thus, if a computer attempts to launch the software tool by providing the invalidated authorization identifier, the software tool—in authenticating the authorization identifier back with the authorization controller application—rejects the provided authorization identifier as invalid.

As part of installing the software tool or tools on a computer (e.g., on an engineer's laptop computer or other device) a user may be registered with the authorization controller application and/or the software owning enterprise. Registration may comprise providing an email address of the user. The user may be registered with the authorization controller application by the software authorization management system. For example, an authorized user may be granted access to the user interface of the software authorization management system and use the interface to complete this registration process. When a user requests an authorization (e.g., an authorization identifier), the user interface of the software authorization management system may first check with the authorization controller application to determine if this user is already registered. If not, the software authorization management system prompts the user to complete registration activities. Otherwise, the software authorization management system checks to see if any authorizations it owns (e.g., authorizations owned by the enterprise operating the software authorization management system) are currently unallocated. If so, the software authorization management system requests that the authorization controller application send an authorization identifier to the requesting user—for example send the authorization identifier to an email address associated with this user during the user registration process.

To manage a pre-defined number of authorizations to execute the software, the software authorization management system may maintain two data structures—a first data structure listing unallocated authorizations or authorization identities and a second data structure listing allocated authorizations or authorization identities along with a user name and/or a computer identity. Alternatively, the first data structure simply maintains a count of unallocated authorizations. When a user requests an authorization, the software authorization management system first checks the first data structure to determine if any authorizations remain unallocated. If no unallocated authorization remains, the system rejects the request. If at least one unallocated authorization remains, the software authorization management system checks the second data structure to see if the user requesting an authorization already has three authorizations allocated to them.

If the user already has three (or some other pre-defined or configured maximum number of authorizations per user) authorizations allocated to him or her, the system rejects the request. If the user does not have three authorizations allocated to him or her, the software authorization management system adds an entry in the second data structure indicating the authorization being allocated to this requesting user and the user and/or computer the authorization is associated to and decrements a count of unallocated authorizations in the first data structure. The software authorization management system then requests that the authorization controller application operated by the software owning enterprise send an authorization identifier to the requesting user and/or to the computer identified by the requesting user. In an embodiment, the software authorization management system may update the associated entry in the second data structure to include the specific authorization identifier or handle provided by the authorization controller application to the user and/or the computer. The software authorization management system periodically checks all the computers registered for using the software tool to see if they are using the software tool. For computers that are using the software tool, the software authorization management system searches the second data structure to see if the computer is properly associated with an authorization or authorization identity. If the computer is not properly associated with the authorization or authorization identity, the software authorization management system requests the authorization controller application to invalidate the subject authorization identity, thereby interrupting the unauthorized use of the software tool by the computer. This operates as a kind of a double check on the system and on users of the system.

Figure 1:
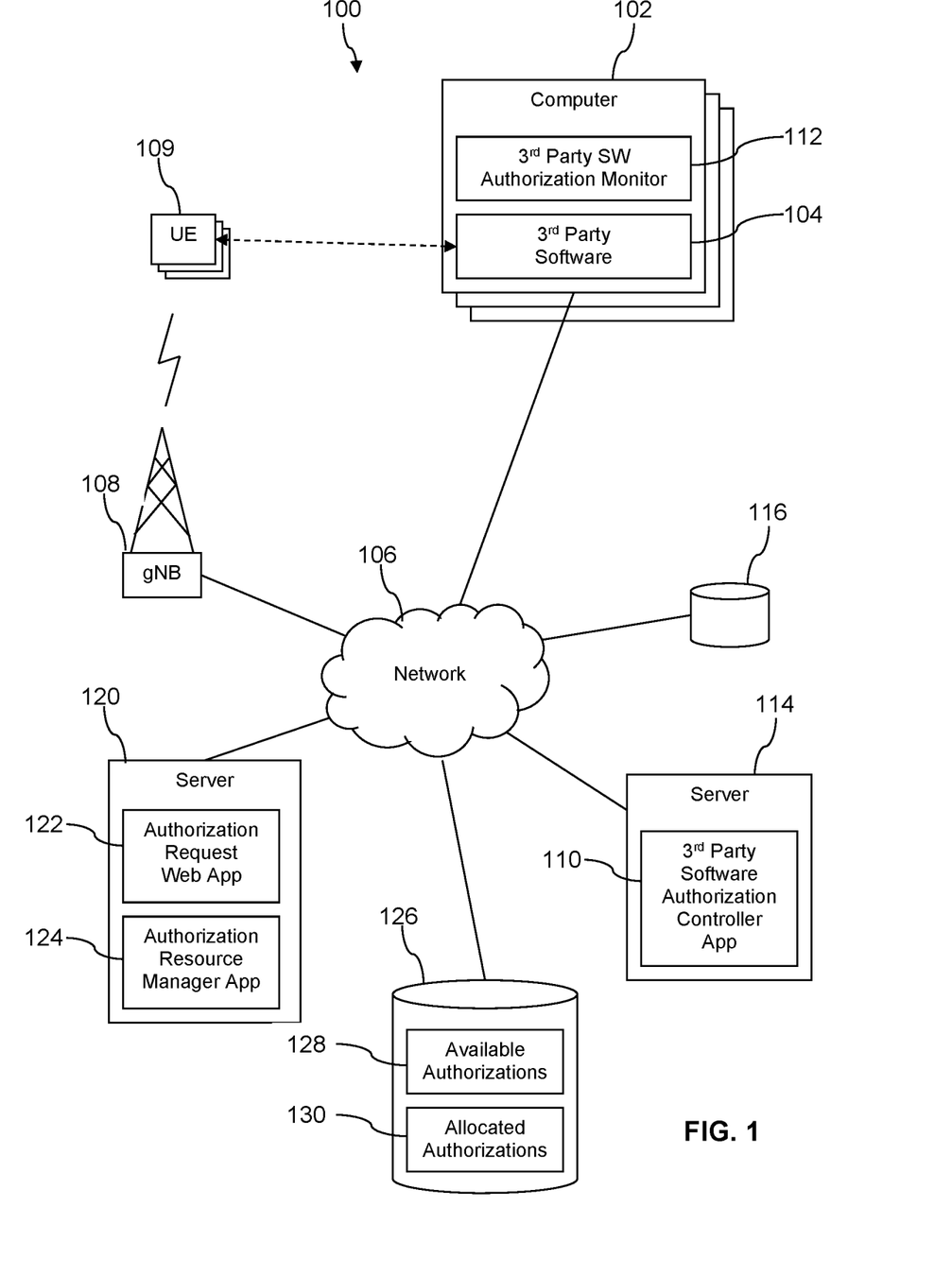
FIG. 1 is a block diagram of a system according to an embodiment of the disclosure.

Turning now to FIG. 1, a system 100 is described. In an embodiment, system 100 comprises a computer 102 that executes third party software 104 stored in a non-transitory memory of the computer 102, a network 106, a cell site 108, and a user equipment (UE) 109. The network 106 comprises one or more private networks, one or more public networks, or a combination thereof. The computer 102 may be a laptop computer, a tablet computer, a notebook computer, a desktop computer, or some other computer. The third party software 104 may be a software tool that supports testing and/or troubleshooting one or more UEs 109. The UE 109 may be a mobile phone, a smart phone, a personal digital assistant (PDA), a wearable computer, a headset computer, a laptop computer, a notebook computer, a tablet computer, or an Internet of things (IoT) device. The cell site 108 may provide a wireless communication link to the UE 109 according to a 5G, a long-term evolution (LTE), a wideband code division multiple access (WCDMA), a code division multiple access (CDMA), or a global system for mobile communications (GSM) telecommunication protocol. The cell site 108 may communicatively couple the UE 109 to the network 106, and the network 106 may communicatively couple the UE 109 to other devices such as content servers, application servers, or other UEs 109. The network 106 may communicatively couple the UE 109 to the computer 102.

The dotted double arrow line between the UE 109 and the third party software 104 is intended to suggest a communication session between the third party software 104 and the UE 109, for example a testing session or a diagnostic session managed by the third party software 104. The third party software 104 may enable specific testing and or diagnostic operations on a chipset installed in the UE 109. It is understood that the system 100 may comprise any number of UEs 109, any number of cell sites 108, and any number of computers 102.

In an embodiment, a user may launch the third party software 104 by invoking a command in a user interface provided by a third party software authorization monitor client 112 stored in a non-transitory memory of the computer 102. The user may provide an authorization identity if this is the first time the user has launched the software 104 (or if a previously entered authorization identity has been invalidated). The third party software authorization monitor client 112 may communicate via the network 106 with a third party software authorization controller application 110 executing on a computer 114. The authorization monitor client 112 may send the authorization identity provided by the user to the authorization controller application 110, and the authorization controller application 110 may map this authorization identity to an authorization of record associated to authorization identity. If the authorization controller application 110 determines that the authorization identity is associated to a valid actual authorization, the software authorization controller application 110 sends an authorization granted message to the authorization monitor client 112, and the authorization monitor client 112 launches the third party software 104 and provides an interface for using the software 104 on the computer 102, for example a graphical user interface (GUI). While FIG. 1 represents the third party software authorization monitor client 112 as separate from the third party software 104, in an embodiment, the functionality described as provided by the authorization monitor client 112 may be integrated into the third party software 104 and the authorization monitor client 112 may not be a separate component.

The authorization identity may be considered to be a reference to or an index to or a handle of the actual authorization. The association of an authorization identity to an actual authorization may be stored in a data store 116 maintained by the third party that owns the third party software. The association of the authorization identity to a corresponding actual authorization may be transitory. Said in other words, over time different authorization identities may be associated to an actual authorization but at any particular time, only one authorization identity is associated to an actual authorization. In an embodiment, actual authorizations may be acquired for relatively long time durations such as for a quarter of a year, a half of a year, for a year, or for some other time duration. In an embodiment, an authorization identity association to an actual authorization may persist for a relatively short time duration such as for a month, for a week, for a day, or for some other time duration.

The system 100 further comprises a computer 120 that executes an authorization request web application 122 and an authorization resource manager application 124. The authorization request web application 122 and the authorization resource manager application 124 may collectively be said to comprise a software authorization management system. The authorization request web application 122 and the authorization resource manager application 124 may manage short term or transient allocation of actual authorizations among a plurality of users and/or computers 102. For example, the software authorization management system comprising the authorization request web application 122 and the authorization resource manager application 124 may manage a pool of about 20 actual authorizations that they allocate among 10, 20, 30, 40, 50, or 100 computers 102.

In an embodiment, the authorization resource manager application 124 maintains an available authorizations data structure 128 and an allocated authorizations data structure 130 in a data store 126. As an example, the authorization resource manager application 124 has 20 authorizations that are good for a year and allocated these authorizations temporarily to computers 102 as requested by users. When no authorizations are allocated, the available authorization data structure 128 indicates 20 authorizations are available. When a user requests an authorization via the authorization request web application 122, the authorization resource manager application 124 first determines if the user is authorized to receive an authorization to operate the third party software. First, the user must be registered with the third party software authorization controller application 110 and with the authorization resource manager application 124. In an embodiment, the authorization resource manager application 124 may check with the software authorization controller application 110 to see if the user is registered. Alternatively, the authorization resource manager application 124 may check in the data store 126 to see if the user is registered. Second, the user must not already have a pre-defined maximum number of authorizations allocated to him or to her. In an embodiment, a user may be allocated a maximum of three authorizations (one authorization for each of three different computers 102). If a user who already has three authorizations allocated to her requests another authorization, this request is rejected by the authorization resource manager application 124.

If the user is authorized to receive an authorization, the authorization resource manager application 124 reaches out to the software authorization controller application 110 to request an authorization identity associated with an actual authorization owned or leased by an enterprise that maintains the computer 120. The software authorization controller application 110 provides an authorization identity that is associated to the actual authorization to the authorization resource manager application 124. The authorization resource manager application 124 decrements the count of available authorizations in the available authorizations data store 128 and stores a record in the allocated authorizations data store 130 that comprises the authorization identity, the identity of the user that requested the authorization identity, and the identity of the computer 102 the user is requesting to use the authorization identity on. The software authorization controller application 110 also stores an association between the authorization identity and the actual authorization in the data store 116 and emails the authorization identity to the user requesting the authorization. If the count of available authorizations stored in the available authorizations data structure 128, the authorization resource manager application 124 rejects the request for an authorization.

The authorization resource manager application 124 periodically invalidates all the authorizations allocated to the computers 102. For example, once per week the authorization resource manager application 124 reaches out to the software authorization controller application 110 and instructs it to invalidate each of the authorization identities associated with authorizations in the data store 116. The authorization resource manager 124 may send a list of the subject authorization identities to the software authorization controller application 110. In an embodiment, the authorization resource manager application 124 first checks to see if any of the computers 102 is currently using one of the authorization identities and if so does not request that authorization to be invalidated. In an embodiment, the authorization resource manager application 124 begins a background script or application that periodically checks or polls the computer 102 executing the third party software 104. When the subject computer 102 is determined to have terminated the third party software 104 or to have powered off, at that time the authorization resource manager application 124 requests the software authorization controller application 110 to invalidate the authorization identity that had been in use by the computer 102. In an embodiment, the authorization resource manager application 124 may begin invalidating authorization identities late Sunday night or early Monday morning.

In an embodiment, the authorization resource manager application 124 periodically polls each of the computers 102 to determine if the computer 102 is using the third party software 104. If the computer 102 is using the third party software 104, the authorization resource manager application 124 may check the allocated authorizations 130 to determine if the computer 102 and/or user are allocated an authorization. If the computer 102 is not indicated to be allocated an authorization, the authorization resource manager application 124 may send a request to the software authorization controller application 110 to invalidate the authorization identity used by the computer 102. In an embodiment, the authorization resource manager application 124 is written in a scripting language such as Python.

Figure 2A:
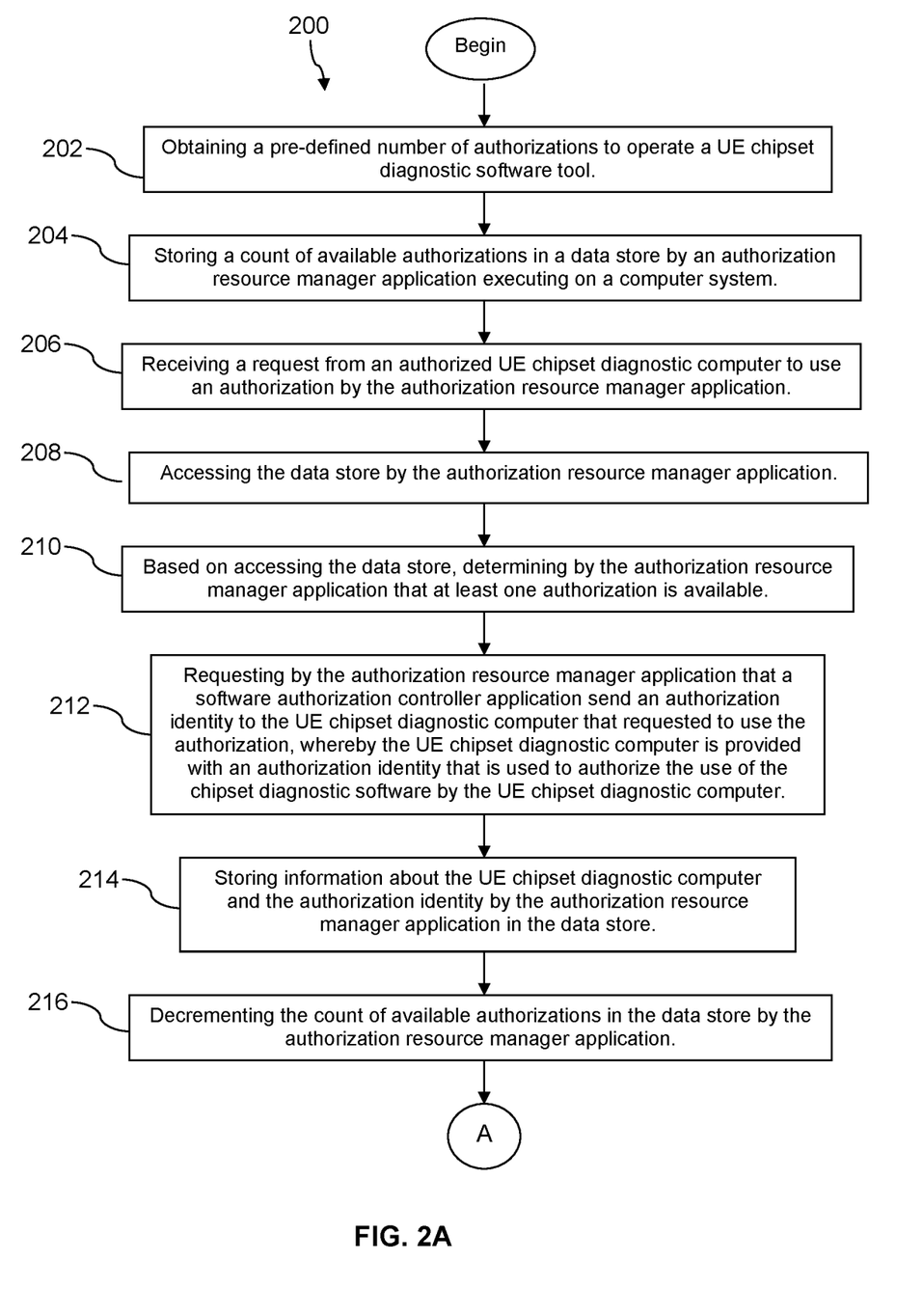
FIG. 2A and FIG. 2B are a flow chart of a method according to an embodiment of the disclosure.
Figure 2B:
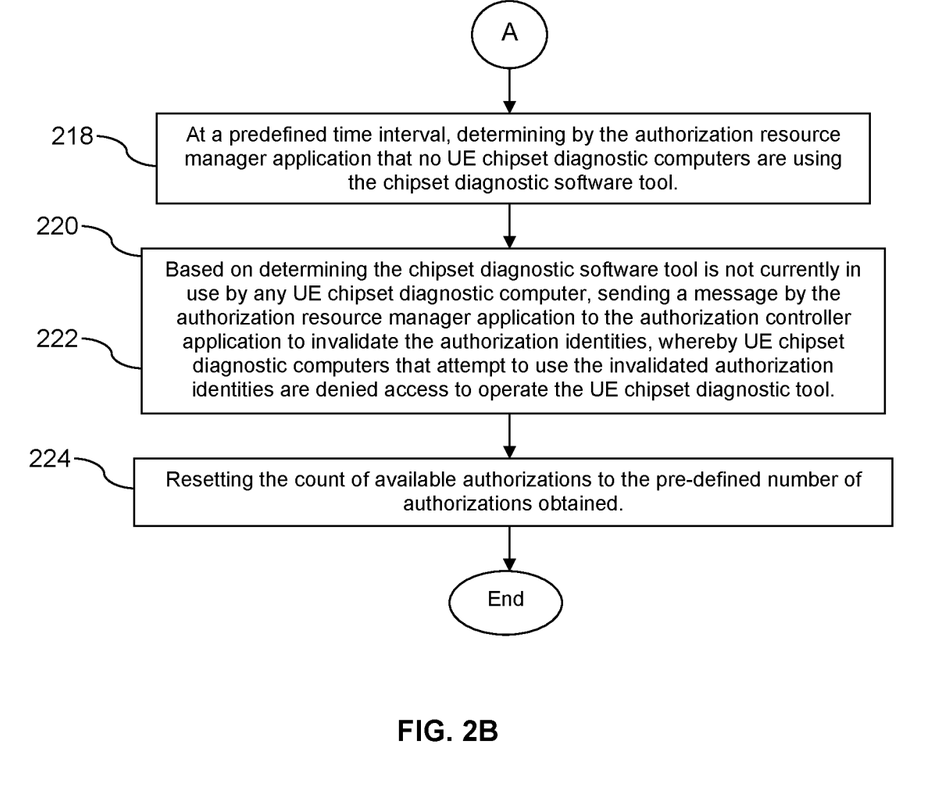

Turning now to FIG. 2A and FIG. 2B, a method 200 is described. In an embodiment, method 200 is a method of managing access to a pre-defined number of authorizations to operate a user equipment (UE) chipset diagnostic software tool. In an embodiment, operating the diagnostic software tool may include operating, decoding, and collecting information from a UE chipset. At block 202, the method 200 comprises obtaining a pre-defined number of authorizations to operate a UE chipset diagnostic software tool. In an embodiment, the UE chipset diagnostic software tool interworks with UEs that are one or a mobile phone, a personal digital assistant (PDA), a smart phone, a laptop computer, a tablet computer, a notebook computer, a wearable computer, a headset computer, or an Internet of things (IoT) device.

At block 204, the method 200 comprises storing a count of available authorizations in a data store by an authorization resource manager application executing on a computer system. At block 206, the method 200 comprises receiving a request from an authorized UE chipset diagnostic computer to use an authorization by the authorization resource manager application.

At block 208, the method 200 comprises accessing the data store by the authorization resource manager application. At block 210, the method 200 comprises, based on accessing the data store, determining by the authorization resource manager application that at least one authorization is available. In an embodiment, before performing block 210, the authorization resource manager application determines if a user associated with the request to use an authorization is a registered user. If the user is not registered, the authorization resource manager application may reject the request to use an authorization. Alternatively, the authorization resource manager application may prompt the user to complete a registration process whereby the user becomes registered with a third party software authorization controller application. In an embodiment, the authorization resource manager application keeps track of registered users in the data store. Alternatively, the authorization resource manager application determines if a user is registered by sending a query to the third party software authorization controller application, and the third party software authorization controller application attempts to look up the user in a data store, for example in data store 116.

At block 212, the method 200 comprises requesting by the authorization resource manager application that a software authorization controller application send an authorization identity to the UE chipset diagnostic computer that requested to use the authorization, whereby the UE chipset diagnostic computer is provided with an authorization identity that is used to authorize the use of the chipset diagnostic software by the UE chipset diagnostic computer. At block 214, the method 200 comprises storing information about the UE chipset diagnostic computer and the authorization identity by the authorization resource manager application in the data store.

At block 216, the method 200 comprises decrementing the count of available authorizations in the data store by the authorization resource manager application. At block 218, the method 200 comprises, at a predefined time interval, determining by the authorization resource manager application that no UE chipset diagnostic computers are using the chipset diagnostic software tool. In an embodiment, the predefined time interval is once per week. In an embodiment, the predefined interval occurs weekly on Sunday evening or Monday morning. In an embodiment, the method 200 further comprises determining by the authorization resource manager application that a UE chipset diagnostic computer is using the chipset diagnostic software tool at the predefined time interval and starting a background process on the computer system that polls the UE chipset diagnostic computer to determine when it stops using the chipset diagnostic software tool. At the point it stops using the chipset diagnostic tool, the background process reports back to the authorization resource manager application, and the authorization resource manager application then invalidates that authorization identity.

At block 220, the method 200 comprises, based on determining the chipset diagnostic software tool is not currently in use by any UE chipset diagnostic computer, sending a message by the authorization resource manager application to the software authorization controller application to invalidate the authorization identities, whereby UE chipset diagnostic computers that attempt to use the invalidated authorization identities are denied access to operate the UE chipset diagnostic tool. At block 224, the method 200 comprises resetting the count of available authorizations to the pre-defined number of authorizations obtained.

Figure 3:
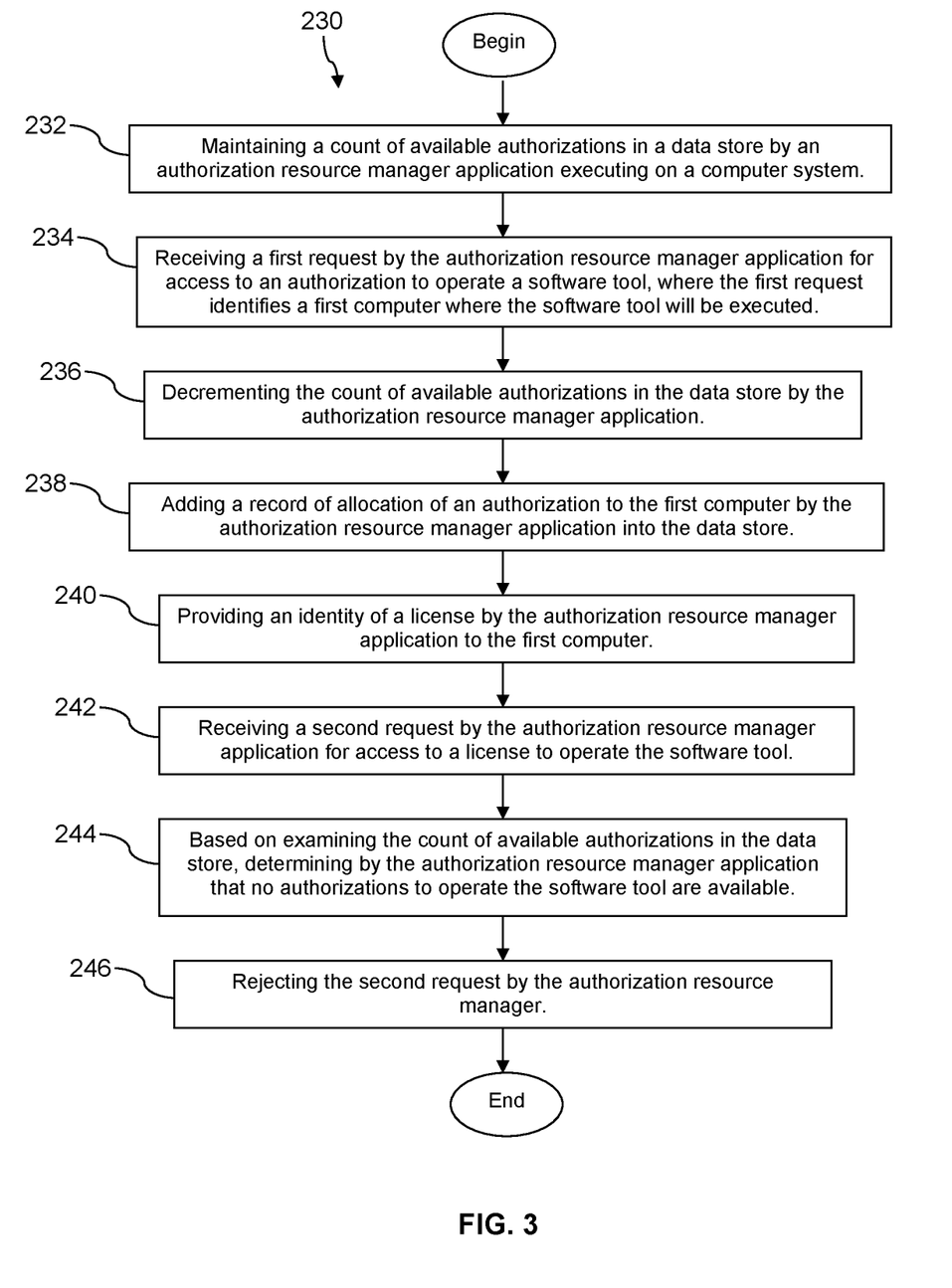
FIG. 3 is a flow chart of another method according to an embodiment of the disclosure.

Turning now to FIG. 3, a method 230 is described. In an embodiment, method 230 is a method of managing access to a pre-defined number of authorizations to operate a software tool. In an embodiment, the software tool is a user equipment (UE) chipset testing tool. At block 232, the method 230 comprises maintaining a count of available authorizations in a data store by an authorization resource manager application executing on a computer system. At block 234, the method 230 comprises receiving a first request by the authorization resource manager application for access to an authorization to operate a software tool, where the first request identifies a first computer where the software tool will be executed. In an embodiment, the software tool is installed on the first computer.

At block 236, the method 230 comprises decrementing the count of available authorizations in the data store by the authorization resource manager application. At block 238, the method 230 comprises adding a record of allocation of an authorization to the first computer by the authorization resource manager application into the data store.

At block 240, the method 230 comprises providing an identity of an authorization by the authorization resource manager application to the first computer. In an embodiment, providing an identity of an authorization by the authorization resource manager application to the first computer comprises the authorization resource manager application obtaining the identity of the authorization from a software authorization controller application executing on a computer and the software authorization controller application sending the identity of the authorization to a user associated with the first computer. In an embodiment, the authorization is valid for a year and the identity of the authorization provided to the first computer is valid for no more than one week. At block 242, the method 230 comprises receiving a second request by the authorization resource manager application for access to an authorization to operate the software tool.

At block 244, the method 230 comprises based on examining the count of available authorizations in the data store, determining by the authorization resource manager application that no authorizations to operate the software tool are available. At block 246, the method 230 comprises rejecting the second request by the authorization resource manager. In an embodiment, the method 230 further comprises receiving a third request by the authorization resource manager application for access to an authorization to operate the software tool; based on examining the records of allocation of authorizations in the data store, determining by the authorization resource manager application that a user associated with the third request is allocated a pre-defined maximum number of authorizations to operate the software tool; and rejecting the third request by the authorization resource manager. In an embodiment, the pre-defined maximum number of authorizations is three. In an embodiment, the pre-defined maximum number of authorizations is four. In an embodiment, the pre-defined maximum number of authorizations is five.

Figure 4:
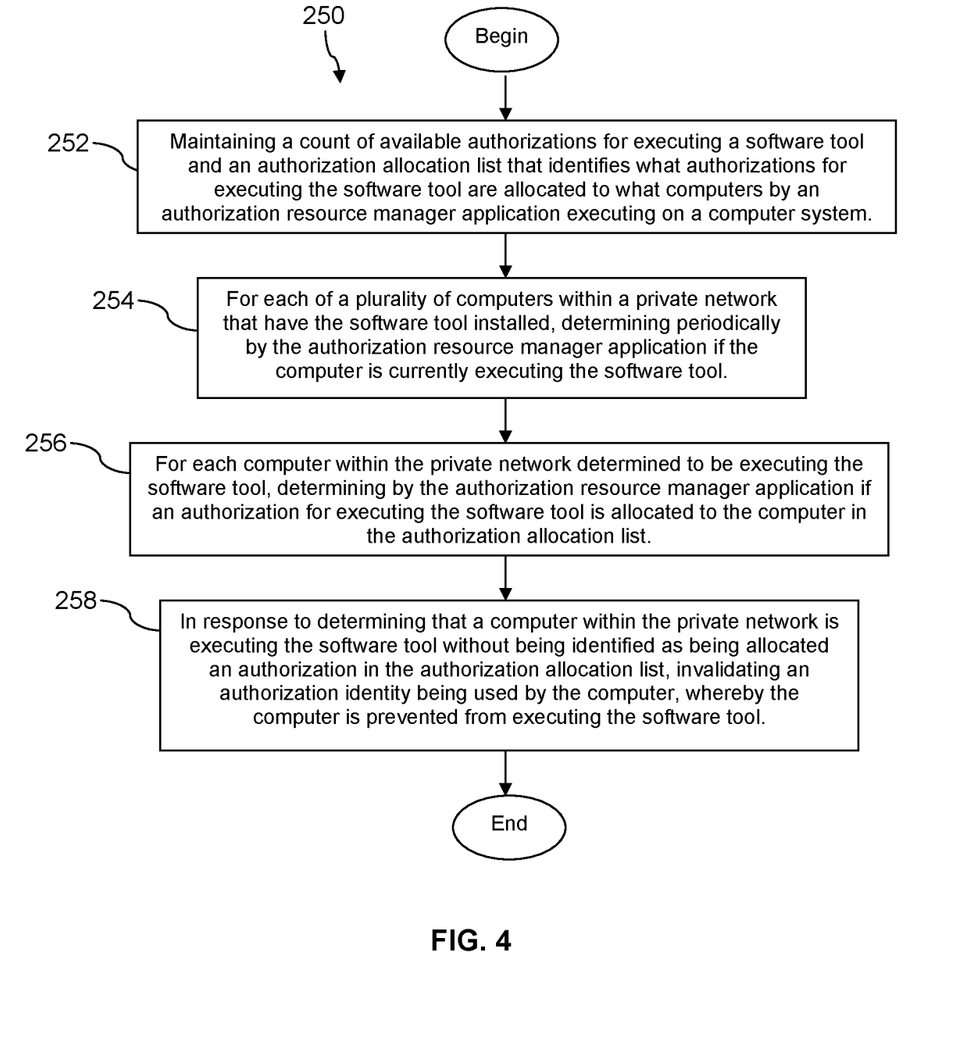
FIG. 4 is a flow chart of yet another method according to an embodiment of the disclosure.

Turning now to FIG. 4, a method 250 is described. In an embodiment, method 250 is a method of managing access to a pre-defined number of authorizations to operate a software tool. In an embodiment, the software tool is a tool for monitoring chipsets of user equipments (UEs). In an embodiment, the UEs are one of a mobile phone, a smart phone, a personal digital assistant (PDA), a wearable computer, a headset computer, a laptop computer, a notebook computer, a tablet computer, or an Internet of things (IoT) device. At block 252, the method 250 comprises maintaining a count of available authorizations for executing a software tool and an authorization allocation list that identifies what authorizations for executing the software tool are allocated to what computers by an authorization resource manager application executing on a computer system.

At block 254, the method 250 comprises, for each of a plurality of computers within a private network that have the software tool installed, determining periodically by the authorization resource manager application if the computer is currently executing the software tool. At block 256, the method 250 comprises, for each computer within the private network determined to be executing the software tool, determining by the authorization resource manager application if an authorization for executing the software tool is allocated to the computer in the authorization allocation list.

At block 258, the method 250 comprises, in response to determining that a computer within the private network is executing the software tool without being identified as being allocated an authorization in the authorization allocation list, invalidating an authorization identity being used by the computer, whereby the computer is prevented from executing the software tool. In an embodiment, invalidating the authorization identity comprises sending a request to invalidate the authorization identity to a software authorization controller application that manages associations between authorizations and authorization identities. In an embodiment, the method 250 further comprises the authorization resource manager application periodically invalidating all authorization identities. In an embodiment, the authorization resource manager application invalidates all authorization identities once per week. In an embodiment, the authorization resource manager application invalidates all authorization identities every day, every two weeks, every three weeks, every month, or every two months.

Figure 5:
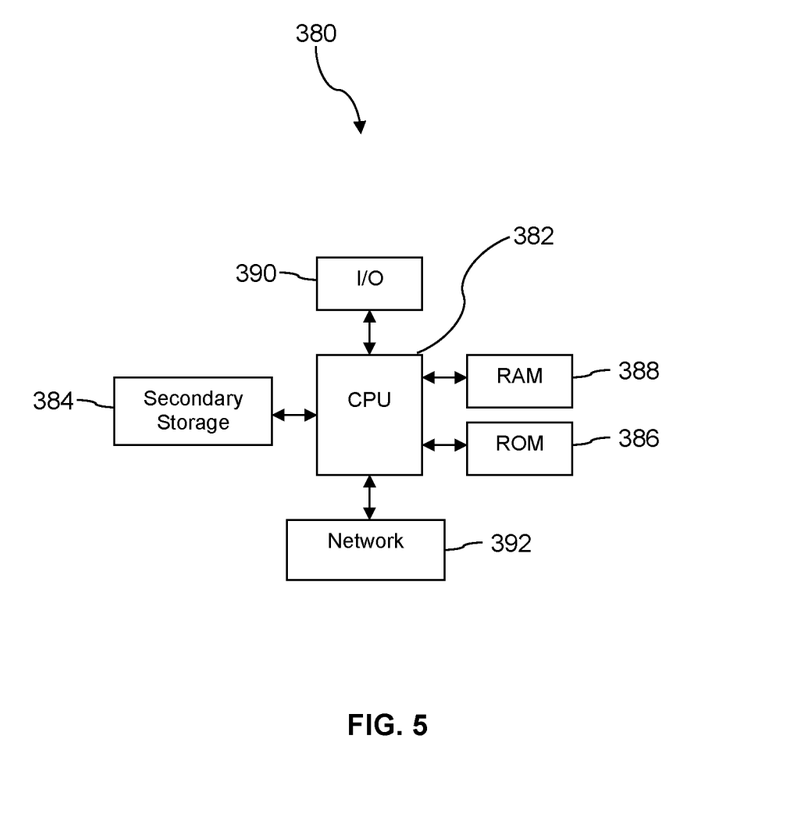
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of managing access to a pre-defined number of authorizations to operate a user equipment (UE) chipset diagnostic software tool, comprising:

obtaining the pre-defined number of authorizations to operate the UE chipset diagnostic software tool;

storing a count of available authorizations in a data store by an authorization resource manager application executing on a computer system;

receiving a request from an authorized UE chipset diagnostic computer to use an authorization by the authorization resource manager application;

accessing the data store by the authorization resource manager application;

based on accessing the data store, determining by the authorization resource manager application that at least one authorization is available;

requesting by the authorization resource manager application that a software authorization controller application send an authorization identity to the authorized UE chipset diagnostic computer that requested to use the authorization, whereby the authorized UE chipset diagnostic computer is provided with an authorization identity that is used to authorize the use of the chipset diagnostic software by the authorized UE chipset diagnostic computer;

storing information about the authorized UE chipset diagnostic computer and the authorization identity by the authorization resource manager application in the data store;

decrementing the count of available authorizations in the data store by the authorization resource manager application;

at a predefined time interval, determining by the authorization resource manager application that no authorized UE chipset diagnostic computers are using the chipset diagnostic software tool;

based on determining the chipset diagnostic software tool is not currently in use by any authorized UE chipset diagnostic computer, sending a message by the authorization resource manager application to the software authorization controller application to invalidate the authorization identities, whereby authorized UE chipset diagnostic computers that attempt to use the invalidated authorization identities are denied access to operate the UE chipset diagnostic software tool; and resetting the count of available authorizations to the pre-defined number of authorizations obtained.

2. The method of claim 1, wherein the predefined time interval is once per week.

3. The method of claim 2, wherein the predefined time interval occurs weekly on Sunday evening.

4. The method of claim 1, wherein the UE chipset diagnostic software tool interworks with UEs that are one or a mobile phone, a personal digital assistant (PDA), a smart phone, a laptop computer, a tablet computer, a notebook computer, a wearable computer, a headset computer, or an Internet of things (IoT) device.

5. The method of claim 1, further comprising determining by the authorization resource manager application if a user associated with the request to use an authorization is a registered user.

6. The method of claim 5, wherein determining if the user is a registered user comprises the authorization resource manager application asking the software authorization controller application if the user is a registered user.

7. The method of claim 1, further comprising determining by the authorization resource manager application that a UE chipset diagnostic computer is using the chipset diagnostic software tool at the predefined time interval and starting a background process on the computer system that polls the UE chipset diagnostic computer to determine when it stops using the chipset diagnostic software tool.

8. A method of managing access to a pre-defined number of authorizations to operate a software tool, comprising:

maintaining a count of available authorizations in a data store by an authorization resource manager application executing on a computer system;

receiving a first request by the authorization resource manager application for access to an authorization to operate the software tool, where the first request identifies a first computer where the software tool will be executed and a user;

responsive to the count of available authorizations being nonzero and a number of authorizations allocated to the user being less than a threshold, decrementing the count of available authorizations in the data store by the authorization resource manager application, wherein the threshold is a pre-defined maximum number of authorizations for the user to operate the software tool;

adding a record of allocation of an authorization to the first computer and the user by the authorization resource manager application into the data store;

providing an identity of an authorization by the authorization resource manager application to the first computer;

receiving a second request by the authorization resource manager application for access to an authorization to operate the software tool;

based on examining the count of available authorizations in the data store, determining by the authorization resource manager application that no authorizations to operate the software tool are available; and rejecting the second request by the authorization resource manager.

9. The method of claim 8, wherein providing an identity of an authorization by the authorization resource manager application to the first computer comprises the authorization resource manager application obtaining the identity of the authorization from a software authorization controller application executing on a computer and the software authorization controller application sending the identity of the authorization to the user, wherein the user is associated with the first computer.

10. The method of claim 8, further comprising:

receiving a third request by the authorization resource manager application for access to an authorization to operate the software tool, wherein the third request is associated with the user;

based on examining the records of allocation of authorizations in the data store, determining by the authorization resource manager application that the user is already allocated the pre-defined maximum number of authorizations to operate the software tool; and rejecting the third request by the authorization resource manager application.

11. The method of claim 10, wherein the pre-defined maximum number of authorizations is three.

12. The method of claim 8, wherein the software tool is a user equipment (UE) chipset testing tool.

13. The method of claim 8, wherein the authorization is valid for a year and the identity of the authorization provided to the first computer is valid for no more than one week.

14. The method of claim 8, wherein the software tool is installed on the first computer.

15. A method of managing access to a pre-defined number of authorizations to operate a software tool, comprising:

maintaining a count of available authorizations for executing the software tool and an authorization allocation list that identifies what authorizations for executing the software tool are allocated to what computers by an authorization resource manager application executing on a computer system;

for each of a plurality of computers within a private network that have the software tool installed, determining periodically by the authorization resource manager application if the computer is currently executing the software tool;

for each computer within the private network determined to be executing the software tool, determining by the authorization resource manager application if an authorization for executing the software tool is allocated to the computer in the authorization allocation list;

in response to determining that a computer within the private network is executing the software tool without being identified as being allocated an authorization in the authorization allocation list, invalidating an authorization identity being used by the computer, whereby the computer is prevented from executing the software tool;

determining, at a programmed time, which computers of the plurality of computers are executing the software tool; and in response to determining which computers of the plurality of computers are executing the software tool, invalidating authorization identities being used by each computer of the plurality of computers not executing the software tool.

16. The method of claim 15, wherein the software tool is a tool for monitoring chipsets of user equipments (UEs).

17. The method of claim 16, wherein the UEs are one of a mobile phone, a smart phone, a personal digital assistant (PDA), a wearable computer, a headset computer, a laptop computer, a notebook computer, a tablet computer, or an Internet of things (IoT) device.

18. The method of claim 15, wherein invalidating the authorization identity comprises sending a request to invalidate the authorization identity to a software authorization controller application that manages associations between authorizations and authorization identities.

19. The method of claim 15, further comprising the authorization resource manager application periodically invalidating all authorization identities.

20. The method of claim 19, where the authorization resource manager application invalidates all authorization identities once per week.

* * * * *